United States Patent
Karnalkar et al.

(10) Patent No.: US 8,619,759 B2
(45) Date of Patent: Dec. 31, 2013

(54) SYSTEM FOR VIDEO CALL PROCESSING

(75) Inventors: Anup Karnalkar, Allen, TX (US); William S. Robbins, Sun Prairie, WI (US); Jeffrey Mikan, Atlanta, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1255 days.

(21) Appl. No.: 11/763,814

(22) Filed: Jun. 15, 2007

(65) Prior Publication Data

US 2008/0309753 A1 Dec. 18, 2008

(51) Int. Cl.
*H04L 12/66* (2006.01)

(52) U.S. Cl.
USPC .......................................... 370/354; 370/401

(58) Field of Classification Search
None
See application file for complete search history.

(56) References Cited

U.S. PATENT DOCUMENTS

| | | | |
|---|---|---|---|
| 5,371,534 A | 12/1994 | Dagdeviren et al. | |
| 5,717,857 A | 2/1998 | Burkman et al. | |
| 5,920,693 A | 7/1999 | Burkman et al. | |
| 7,102,663 B2 | 9/2006 | Crook | |
| 7,463,619 B1 * | 12/2008 | Prokop et al. | 370/352 |
| 7,773,544 B2 * | 8/2010 | Gerding et al. | 370/260 |
| 2002/0051463 A1 * | 5/2002 | Higuchi | 370/466 |
| 2003/0071890 A1 | 4/2003 | McClure | |
| 2004/0239754 A1 * | 12/2004 | Shachar et al. | 348/14.08 |
| 2005/0162507 A1 | 7/2005 | Du | |
| 2006/0002373 A1 * | 1/2006 | Denny | 370/352 |
| 2007/0297339 A1 * | 12/2007 | Taylor et al. | 370/248 |
| 2008/0049725 A1 * | 2/2008 | Rasanen | 370/352 |
| 2008/0062253 A1 * | 3/2008 | Jaspersohn et al. | 348/14.11 |

* cited by examiner

*Primary Examiner* — Gregory Sefcheck
*Assistant Examiner* — Daniel Mitchell
(74) *Attorney, Agent, or Firm* — Guntin & Gust, PLC; Jay H. Anderson

(57) ABSTRACT

A system for video call processing is disclosed. A system that incorporates teachings of the present disclosure may include, for example, a first communication device having a controller element to establish by way of a PSTN port of the first communication device a Public Switched Telephone Network communication session with a second communication device, submit by way of a broadband port of the first communication device a first Session Initiation Protocol (SIP) message to determine whether the second communication device has video capability, receive a second SIP message indicating the second communication device is video capable, present a notice indicating the second communication device is video capable, receive a request to establish video communications with the second communication device, and submit a third SIP message to establish a video communication session with the second communication device. Additional embodiments are disclosed.

16 Claims, 4 Drawing Sheets

300

400

SYSTEM FOR VIDEO CALL PROCESSING

FIELD OF THE DISCLOSURE

The present disclosure relates generally to communication techniques and more specifically to a system for video call processing.

BACKGROUND

The adoption rate of phones with video communication capability has been slow due in part to privacy concerns and further due to the complex setup and operations of a video call with webcams and videophones. Some consumers do not want to be seen at times when it may be inconvenient or undesirable. For instance, a consumer may not want to engage in a video conference call with strangers or while engaged in activities that are normally considered private.

Accordingly, a need arises for a system for video call processing.

DETAILED DESCRIPTION

Embodiments in accordance with the present disclosure provide a system for video call processing.

In a first embodiment of the present disclosure, a first communication device can have a controller element to establish by way of a PSTN port of the first communication device a Public Switched Telephone Network communication session with a second communication device, submit by way of a broadband port of the first communication device a first Session Initiation Protocol (SIP) message to determine whether the second communication device has video capability, receive a second SIP message indicating the second communication device is video capable, present a notice indicating the second communication device is video capable, receive a request to establish video communications with the second communication device, and submit a third SIP message to establish a video communication session with the second communication device.

In a second embodiment of the present disclosure, a computer-readable storage medium in a first communication device can have computer instructions for establishing a circuit-switched communication session with second communication device, and initiating a transition to a video Internet Protocol (IP) communication session with the second communication device while the circuit-switched communication session is active between the first and second communication devices.

In a third embodiment of the present disclosure, a Network Management System (NMS) can have a controller element that receives a request from a first communication device to determine whether a second communication device actively engaged in a circuit-switched communication session with the first communication device is capable of engaging in a video communication session.

Figure 1:
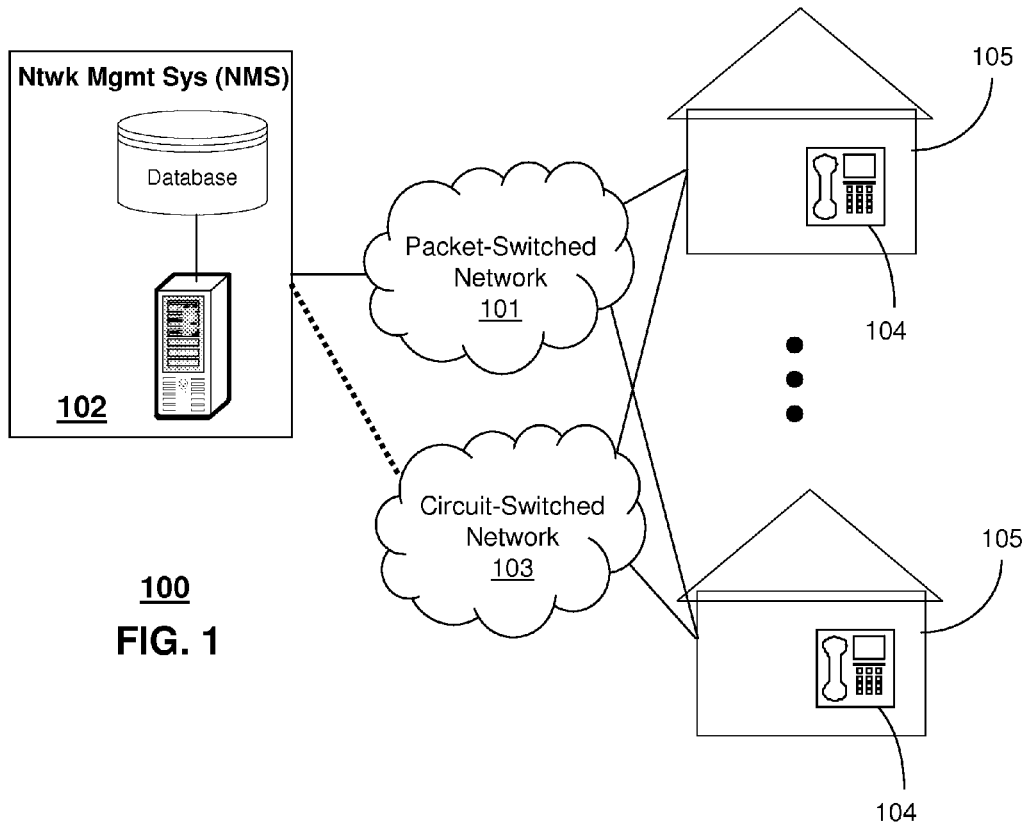
FIG. 1 depicts an exemplary embodiment of a communication system.

FIG. 1 depicts an exemplary embodiment of a communication system 100. The communication system 100 can comprise a Network Management System (NMS) 102 operably coupled to one or more communication devices 104 housed in a building 105 by way of a common packet-switched network such as an Internet Protocol (IP) network 101, and a circuit-switched network such as a Public Switched Telephone Network (PSTN) 103. The NMS 102 can represent a proxy server, back-to-back user agent (B2B UA), a soft switch or other suitable computing and communication device to perform the functions described herein. The NMS 102 can be used to manage operations of the communication devices 104. The IP network 101 can utilize common communication technology for exchanging packet data between the communication devices 104. The packet data exchanged can be real-time voice, and/or video data. Alternatively, packet data can also represent non-real-time data exchanges (e.g., media files such as music, text, email, browsing, and so on).

Figure 2:
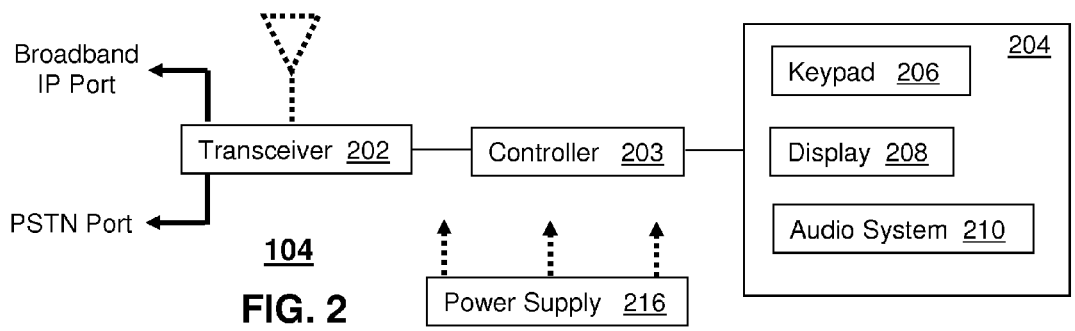
FIG. 2 depicts an exemplary embodiment of a communication device operating in the communication system.

FIG. 2 depicts an exemplary embodiment of the communication device 104. The communication device 104 can comprise a wireless and/or wireline transceiver 202, a user interface (UI) 204, a power supply 216, and a controller 203 for managing operations of the foregoing components. A circuit-switched communication port of the transceiver 202 can utilize common communication technologies to support PSTN or POTS (Plain Old Telephone System) communications. A packet-switched communication port of the transceiver 202 can utilize common communication technologies to support broadband cable, and/or xDSL communications. The circuit-switched communication port of the transceiver 202 can utilize Digital Enhance Cordless Telecommunications (DECT) to support wireless communications with a base unit coupled to the PSTN network 103. Similarly, the packet-switched port can utilize WiFi technology to achieve wireless communications by way of a base unit (e.g., modem/router) coupled to a broadband interface of the IP network 101.

In addition to the aforementioned technologies, the transceiver 202 can support other wireless access technologies such Worldwide Interoperability for Microwave Access (WiMAX), Ultra Wide Band (UWB), software defined radio (SDR), and cellular access technologies such as CDMA-1X, W-CDMA/HSDPA, GSM/GPRS, TDMA/EDGE, and EVDO. Accordingly, the communication device 104 can serve as a multimode communication device with versatility to be used inside and outside of building 105. It should be noted that other next generation wireline and wireless access technologies can also be applied to the present disclosure.

The UI element 204 can include a keypad 206 with depressible or touch-sensitive buttons and a navigation element such as a navigation disk, button, roller ball, or flywheel for manipulating operations of the communication device 104. The UI element 204 can further include a display 208 such as monochrome or color LCD (Liquid Crystal Display) which can be touch-sensitive for manipulating operations of the communication device 104 and for conveying still and video images to the end user of said device, and an audio system 210 that utilizes common audio technology for conveying and intercepting audible signals of the end user.

The power supply 216 can utilize common power management technologies such as replaceable batteries, supply regulation technologies, and charging system technologies for supplying energy to the components of the communication device 104 and to facilitate portable applications. Depending on the type of power supply 216 used, the communication device 104 can be an immobile or portable communication device. The controller 203 can utilize computing technologies such as a microprocessor and/or digital signal processor (DSP) with associated storage memory such a Flash, ROM, RAM, SRAM, DRAM or other like technologies for controlling operations of the communication device 104.

The communication device 104 can represent a single operational device or a family of devices configured in a master-slave arrangement. In the latter embodiment, the components of the communication device 104 can be reused in different form factors (e.g., handset, a touch-screen tablet, and so on). The communication device 104 can thus represent any number of communication devices including without limitation a laptop computer, a desktop computer, a cell phone, a personal digital assistant, a set-top-box (STB) coupled to a display (e.g., a TV), or a cordless phone just to name a few. An end user can also utilize more than one type of communication device 104 and migrate between communication devices when desired.

Figure 3:
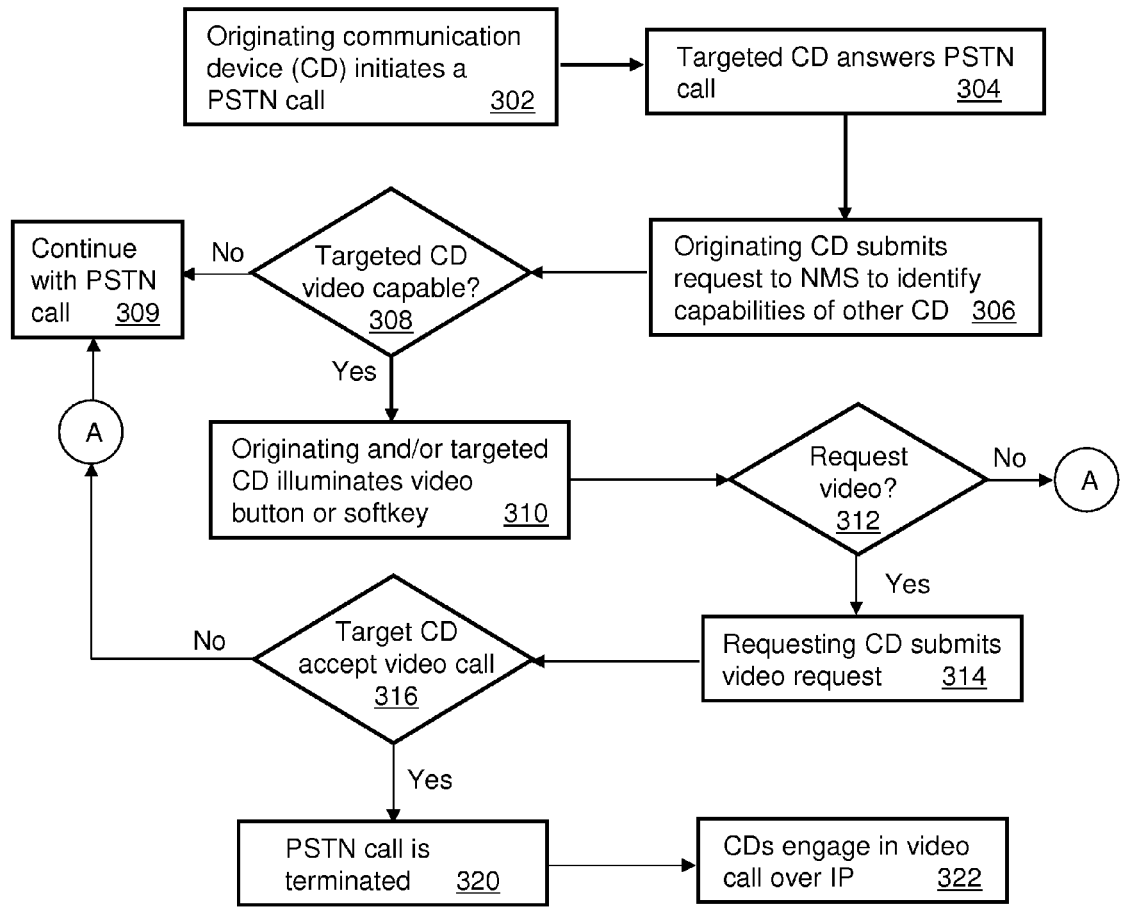
FIG. 3 depicts an exemplary method operating in portions of the communication system.

FIG. 3 depicts an exemplary method 300 operating in portions of the communication system 100. Method 300 begins with step 302 in which an originating communication device (CD) 104 initiates by way of its circuit-switched communication port a PSTN call directed to a targeted CD. Upon the targeted CD 104 answering the PSTN call in step 304, the originating CD initiating the PSTN call submits to the NMS 102 a request to identify the communication capabilities of the targeted CD. The request message can be transmitted to the NMS 102 by way of the packet-switched communication port of the CD as a Session Initiation Protocol (SIP) OPTIONS message. Embedded in the SIP message can be the PSTN telephone number used to establish PSTN communications with the targeted CD 104. In step 308, the NMS 102 can utilize the PSTN number as a means to determine whether the CD called is capable of engaging in video communications utilizing a common video communication protocol such as SIP.

The NMS 102 in the present context can represent a common computing device that manages a database of subscription information associated with PSTN numbers. Alternatively, or in combination, the NMS 102 can be represented by one or more network elements of an IP Multimedia Subsystem (IMS). In this embodiment, the NMS 102 can determine the communication capabilities of the targeted CD 104 by extracting information from a Home Subscriber Server (HSS) and/or telephone number mapping (ENUM) server.

If the NMS 102 notifies the requesting CD 104 that the other CD is not video-capable (or not found as an IP routable target), then the PSTN call continues uninterrupted in step 309. If on the other hand the NMS 102 informs the originating CD 104 that the other CD is video-capable, then the originating CD 104 presents in step 310 a notice to the user that video communications are possible. Alternatively, in step 310 both the requesting and the targeted CDs 104 can be presented with the same notice by mutual discovery directed by the NMS 102. The notice can be provided by way of the UI 204 of the CD 104 in the form of, for example, a visual (e.g., continuous or flashing illuminated button of the keypad 206 or softkey presented by the display 208) and/or an audible stimulus (e.g., an alert tone combined with the visual button illumination). The notice can indicate to both parties that the call can be changed by either party from a voice-only call to a video and voice call by selecting an option in the UI 204 of either CD 104.

In step 312, the CD 104 waits for a response from the user by way of the UI 204. If no response is received (e.g., after a time out period), the CD can for example cease to illuminate the video button. If the CD 104 detects a request for video by, for example, sensing a depression of a video button of the keypad 206, the CD proceeds to step 314 where it submits a SIP INVITE to initiate video communications with the other CD. Once the targeted CD 104 accepts the video call in step 316 by for example depressing a video button of the CD, the PSTN call is terminated by each of the CDs and a 2-way IP video call with real-time audio and video streams between the CDs ensues.

Figure 4:
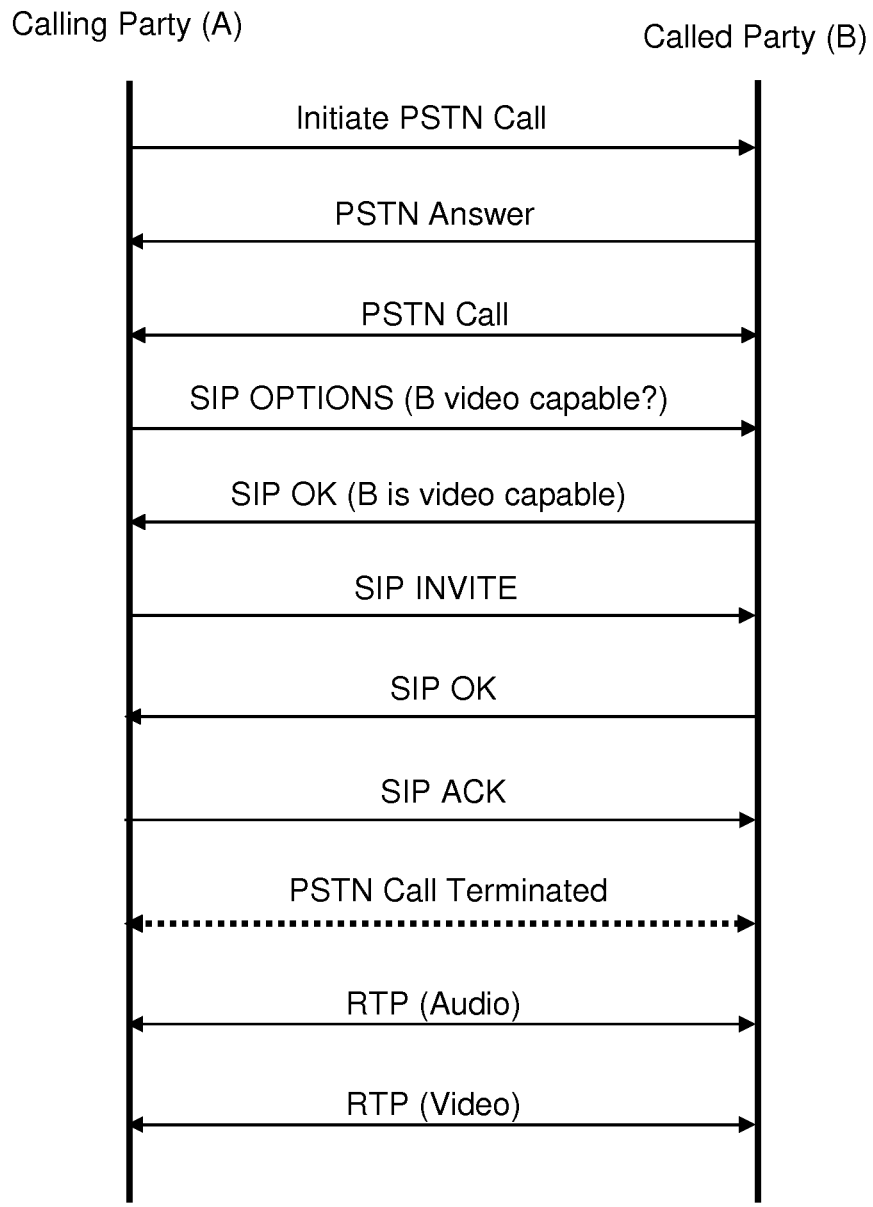
FIG. 4 depicts an exemplary call flow diagram operating in portions of the communication system.

FIG. 4 depicts an exemplary call flow diagram representative of method 300. Call flow begins with a PSTN call initiated by party A. Once the PSTN call is answered by party B, PSTN communications is established between the CDs 104 of party's A and B. The CD 104 of party A then sends a SIP OPTIONS request via its broadband port to the NMS 102 to determine whether the CD of party B is capable of video communications. As noted earlier, the SIP message can include the PSTN number of party B to assist the NMS 102 in searching information relating to the CD of party B. Assuming the CD 104 of party B is video cable, a SIP message is transmitted by the NMS 102 notifying the CD of party A. Responsive to a request submitted by the CD of party A (e.g., user presses illuminated video button), a SIP INVITE is submitted to initiate video communications. A SIP OK message is received indicating the Party B has accepted the video call. A SIP ACK (acknowledgment) is then sent by the CD of Party A indicating it is engaged in the video call. At this point, the CDs of parties' A and B terminate the PSTN call by common means, and a Real-Time Protocol (RTP) audio and video stream of data is exchanged between the CDs representative of a video call.

The aforementioned embodiments provide users a means to maintain their privacy by way of an opt-in option to engage in video communications while first engaged in PSTN communications. It would be evident to an artisan with ordinary skill in the art, however, that the embodiments presented can be modified, reduced, or enhanced without departing from the scope and spirit of the claims described below. For example, the call flow diagram can have more or less steps to initiate a PSTN and video IP communication session. Additionally, the process for discovering the capabilities of each CD 104 can be invoked by either CD and can be shared with both CDs. Consequently, the request to switch to video IP communications can be invoked by either the originating or targeted CD 104. Moreover, the request sent to the NMS 102 to identify the communication capabilities of the CD 104 can be sent by the requesting CD as an SS7 message over the PSTN network 103 rather than a SIP message over the IP network 101.

These and other suitable modifications can be applied to the present disclosure without departing from the scope of the claims. Accordingly, the reader is directed to the claims for a fuller understanding of the breadth and scope of the present disclosure.

Figure 5:
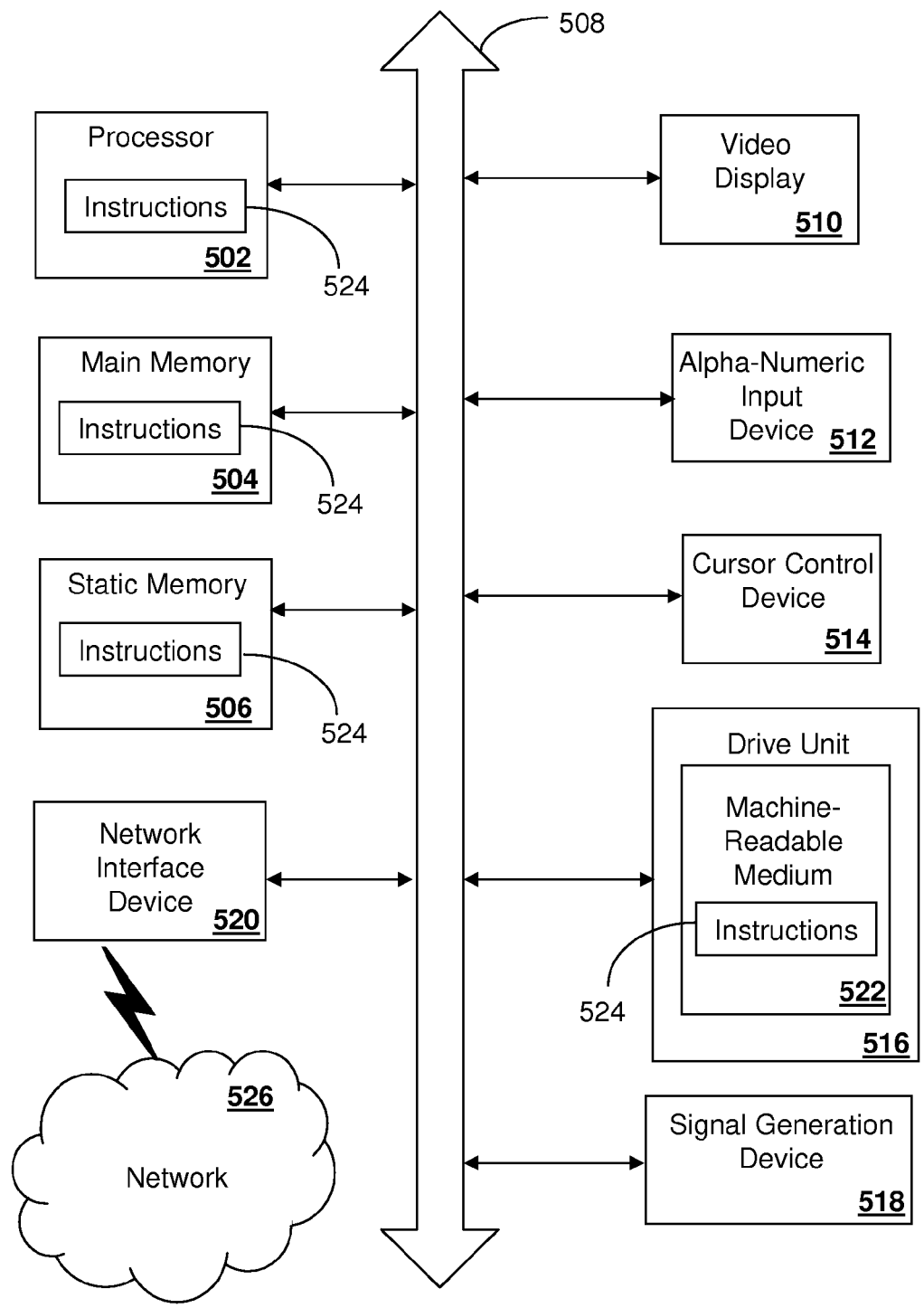
FIG. 5 depicts an exemplary diagrammatic representation of a machine in the form of a computer system within which a set of instructions, when executed, may cause the machine to perform any plurality of the methodologies disclosed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A first communication device, comprising:
a memory having computer instructions and a controller element coupled to the memory which when executing the computer instructions performs operations comprising:
facilitating establishing by way of a public switched telephone network port of the first communication device a public switched telephone network communication session with a second communication device;
submitting by way of a broadband port of the first communication device a first session initiation protocol message to a network management system for performing a device capability search of a database to determine whether the second communication device has video capability without the network management system obtaining capability information from the second communication device;
receiving a second session initiation protocol message indicating the second communication device is video capable;
presenting a notice indicating the second communication device is video capable, wherein the notice is presented by way of a user interface of the first communication device during the public switched telephone network communication session in response to receiving the second session initiation protocol message;
receiving a request to establish video communications with the second communication device, wherein the request is received by way of user input detected by way of the user interface;
submitting a third session initiation protocol message to establish a video internet protocol communication session with the second communication device; and
terminating the public switched telephone network communication session responsive to the video communication session being established, wherein the video internet protocol communication session comprises an exchange of a video stream and an audio stream conforming to a real-time protocol,
wherein the first session initiation protocol message comprises a public switched telephone network number used to establish the public switched telephone network communication session with the second communication device, and
wherein the network management system comprises a server operating in an internet protocol multimedia subsystem that retrieves device information including the video capability associated with the second communication device from a home subscriber server of the internet protocol multimedia subsystem.

2. The first communication device of claim 1, wherein the network management system determines capabilities of the second communication device according to the public switched telephone network number.

3. The first communication device of claim 1, wherein the notice by way of the user interface is presented at the second communication device.

4. The first communication device of claim 1, wherein the user interface comprises a display, and wherein the notice is presented on the display.

5. The first communication device of claim 1, wherein the terminating of the public switched telephone network communication session comprises:
receiving a fourth session initiation protocol message indicating that the video communication session has been established with the second communication device; and
terminating the public switched telephone network communication session responsive to receiving the fourth session initiation protocol.

6. A non-transitory computer-readable storage medium, comprising computer instructions which when executed by a processor cause the processor to perform operations comprising:
facilitating establishing a circuit-switched communication session with a second communication device according to a public switched telephone network number;
presenting a notice indicating the second communication device is video capable, wherein the notice is presented by way of a user interface of a first communication device during the circuit-switched communication session in response to determining the second communication device is video capable;
receiving a request to establish video communications with the second communication device, wherein the request is received by way of input detected by way of the user interface;
submitting the request to a network management system for obtaining communication capabilities of the second communication device without the network management system receiving capability information from the second communication device, wherein the request comprises the public switched telephone network number;
in response to receiving the request, initiating a transition to a video internet protocol communication session with the second communication device while the circuit-switched communication session is active between the first and second communication devices; and
terminating the circuit-switched communication session responsive to the video internet protocol communication session being established, wherein the video internet protocol communication session comprises an exchange of a video stream and an audio stream conforming to a real-time protocol,
wherein the network, management system comprises a server operating in an internet protocol multimedia subsystem that retrieves device information including video capability associated with the second communication device from a home subscriber server of the internet protocol multimedia subsystem.

7. The non-transitory computer-readable storage medium of claim 6, wherein the circuit-switched communication session comprises a public switched telephone network communication session.

8. The non-transitory computer-readable storage medium of claim 6, wherein the terminating of the circuit-switched communication session comprises:
receiving a message indicating the video internet protocol communication session has been established;
terminating the circuit-switched communication session; and switching to the video internet protocol communication session to continue communications with the second communication device.

9. The non-transitory computer-readable storage medium of claim 6, wherein the operations further comprise:
   receiving from the network management system information indicating that the second communication device is video capable; and
   establishing the video internet protocol communication session with the second communication device responsive to the information received from the network management system.

10. The non-transitory computer-readable storage medium of claim 9, wherein the establishing of the video internet protocol communications with the second communication device comprises:
   submitting a first session initiation protocol message to establish video internet protocol communications with the second communication device;
   receiving a second session initiation protocol message indicating that the video communication session has been established with the second communication device; and
   switching to the video internet protocol communication session.

11. The non-transitory computer-readable storage medium of claim 10, wherein the terminating of the circuit-switched communication session comprises:
   receiving a message from the network management system that the video internet protocol communications have been established with the second communication device; and
   terminating the circuit-switched communication session responsive to the received message.

12. The non-transitory computer-readable storage medium of claim 6, wherein the notice is presented at the second communication device.

13. The non-transitory computer-readable storage medium of claim 6, wherein the first communication device comprises a circuit-switch communication port, and a packet-switched communication port, and wherein the circuit-switched communication session takes place by way of the circuit-switch communication port, and the video internet protocol communication session takes place by way of the packet-switched communication port.

14. A network management system, comprising:
   a memory to store computer instructions; and
   a controller element coupled with the memory, wherein the controller element when executing the computer instructions performs operations comprising:
      receiving a first request from a first communication device to determine whether a second communication device actively engaged in a circuit-switched voice communication session with the first communication device is capable of engaging in a video internet protocol communication session, wherein the first request comprises a public switched telephone network number to identify the second communication device;
      determining communication capabilities of the second communication device without obtaining capability information from the second communication device;
      facilitating establishing of the video internet protocol communication session between the first and second communication devices responsive to receiving from the first communication device a second request to establish the video internet protocol communication session with the second communication device without receiving another request from the second communication device to establish the video internet protocol communication session with the first communication device, wherein the second request to establish the video internet protocol communication session is based on user input detected at a user interface of the first communication device during the circuit-switched voice communication session and in response to a determination that the second communication device is video capable; and
      terminating the circuit-switched communication session responsive to the video internet protocol communication session being established, wherein the video internet protocol communication session comprises an exchange of a video stream and an audio stream conforming to a real-time protocol,
   wherein the network, management system comprises a server operating in an internet protocol multimedia subsystem that retrieves device information including video capability associated with the second communication device from a home subscriber server of the internet protocol multimedia subsystem.

15. The network management system of claim 14, wherein the operations further comprise:
   presenting a notice indicating the second communication device is video capable, wherein the notice is presented by way of the user interface.

16. The network management system of claim 15, wherein the operations further comprise determining whether the second communication device is capable of engaging in the video internet protocol communication session according to the public switched telephone network number.

\* \* \* \* \*